(12) United States Patent
Keller et al.

(10) Patent No.: US 9,902,277 B2
(45) Date of Patent: Feb. 27, 2018

(54) METHOD FOR CHARGING A BATTERY HAVING A PLURALITY OF BATTERY CELLS

(71) Applicant: Daimler AG, Stuttgart (DE)

(72) Inventors: John Keller, Portland, OR (US); Connor Torris, Damascus, OR (US)

(73) Assignee: Daimler AG, Stuttgart (DE)

( * ) Notice: Subject to any disclaimer, the term of this patent is extended or adjusted under 35 U.S.C. 154(b) by 199 days.

(21) Appl. No.: 14/869,644

(22) Filed: Sep. 29, 2015

(65) Prior Publication Data
US 2016/0089994 A1 Mar. 31, 2016

(30) Foreign Application Priority Data

Sep. 29, 2014 (GB) .................................. 1417143.3

(51) Int. Cl.
| | | |
|---|---|---|
| *H01M 10/44* | (2006.01) | |
| *B60L 11/18* | (2006.01) | |
| *H02J 7/04* | (2006.01) | |
| *H02J 7/14* | (2006.01) | |
| *H02J 7/00* | (2006.01) | |

(52) U.S. Cl.
CPC ....... *B60L 11/1816* (2013.01); *B60L 11/1861* (2013.01); *H02J 7/007* (2013.01); *H02J 7/0014* (2013.01); *H02J 7/045* (2013.01); *H02J 7/047* (2013.01); *H02J 7/1492* (2013.01); *Y02T 10/92* (2013.01)

(58) Field of Classification Search
CPC .......... H02J 7/007; H02J 7/0417; H02J 7/041; H02J 7/047
USPC .......................... 320/125, 130, 132, 150, 160
See application file for complete search history.

(56) References Cited

U.S. PATENT DOCUMENTS

| | | | | |
|---|---|---|---|---|
| 5,481,174 A | * | 1/1996 | Martin | ................. H02J 7/0093 320/129 |
| 2008/0054847 A1 | * | 3/2008 | Elias | ................. G01R 31/3627 320/130 |
| 2010/0244846 A1 | | 9/2010 | Desprez et al. | |
| 2011/0018503 A1 | * | 1/2011 | Patino | ..................... H02J 7/045 320/162 |
| 2011/0115439 A1 | | 5/2011 | Kim | |
| 2013/0138370 A1 | | 5/2013 | Oh et al. | |

FOREIGN PATENT DOCUMENTS

| | | |
|---|---|---|
| CN | 2446707 Y | 9/2001 |
| CN | 201515252 U | 6/2010 |
| CN | 102157975 A | 8/2011 |
| CN | 202009257 U | 10/2011 |
| EP | 1 798 100 A2 | 6/2007 |
| WO | WO 2012/165879 A2 | 12/2012 |

OTHER PUBLICATIONS

United Kingdom Search Report issued in counterpart GB Application No. GB1417143.3 dated Feb. 23, 2015 (Nine (9) pages).

\* cited by examiner

*Primary Examiner* — Edward Tso
(74) *Attorney, Agent, or Firm* — Crowell & Moring LLP

(57) ABSTRACT

A battery management system for a motor vehicle is disclosed. The system includes at least one battery having multiple battery cells, an automotive electronic control unit including a device for sensing battery quantities, where the battery quantities are the battery terminal current, the battery terminal voltage and a measured or estimated battery or battery box temperature, the battery terminal current, the battery terminal voltage, the measured or estimated battery or battery box temperature, and an automotive alternator supplying a regulation voltage, where the automotive electronic control unit is adapted to drive the battery through a charging cycle, in which a certain charge voltage and/or a certain charge current is supplied to the battery to charge the battery, and the automotive electronic control unit is adapted to control the regulation voltage based upon the sensed battery quantities to supply the certain charge voltage and/or the certain charge current to the battery.

9 Claims, 14 Drawing Sheets

Inner Cell Resistance Diagram

End Cell Diagram

METHOD FOR CHARGING A BATTERY HAVING A PLURALITY OF BATTERY CELLS

This application claims the priority of Great Britain Patent Application No. GB 1417143.3, filed Sep. 29, 2014, the disclosure of which is expressly incorporated by reference herein.

BACKGROUND AND SUMMARY OF THE INVENTION

The invention relates to a battery management system (BMS) for a motor vehicle comprising at least one battery having multiple battery cells, an automotive electronic control unit comprising means of sensing battery quantities, wherein the battery quantities are the battery terminal current, the battery terminal voltage and the battery terminal temperature or the temperature within or in close proximity to the battery location, and an automotive alternator supplying a regulation voltage. In addition, the invention relates to a motor vehicle with a battery management system as well as to a method for charging the battery.

In the past decade there has been a move toward the electrification of automotive system functions allowing for the vehicle engine which would normally power these functions to be shut down when propulsion is not required. These include anti-idling functions, hotel loads and start stop systems. These systems place a greater reliance on the battery pack to act as a load leveling device. Traditionally battery packs are charged via a simple constant voltage. This minimal management of battery charging has functioned well for automobiles which only rely on the vehicle battery pack for starting, and thus have a very small depth of discharge. However in sleeper equipped trucks there are additional hotel and vehicle loads which lead to higher discharge depths. The constant voltage (CV) strategy falls short here, as the need to charge the vehicle quickly comes into conflict with the need to minimize float current to avoid overcharging and gassing once the battery is full. Because the control is static with regard to the battery state, one needs to decide between fully charging the battery with overcharging and avoiding overcharging by promoting undercharging and starvation.

In recent years there has been a switch to Absorbed Glass Matt (AGM) technology batteries which offer a higher C rating, higher design cycles and maintenance free operation. AGM batteries have greater charge acceptance, owing to their lower resistance and the ability to be repeatedly deeply discharged allowing for the powering of hotel load functions such as battery powered HVAC (Heating, Ventilation and Air Conditioning), CPAP (Continuous Positive Airway Pressure) machines and appliances. However, AGM batteries have a lower equilibrium voltage than flooded cell batteries which makes them subject to greater overcharge when using the same CV voltage set point. AGM batteries also receive greater damage due to overcharge then the legacy battery design due to a lack of excess electrolyte present. The loss of electrolyte due to overcharging is a contributing cause of multiple failure modes of the AGM battery. If they are used as a drop-in replacement for flooded batteries under a static fixed voltage charge regime, their service life will be a fraction of their intended design life.

While the vehicle engine is running the system voltage is regulated by the alternator. The system voltage also serves as the charging voltage for the vehicle battery pack; the static system voltage of 14.2 volts is a design trade off made to balance charge time for the vehicle's batteries against float current. A higher voltage will reduce charge times but increase float current where as a lower voltage will increase charge times but reduce float current. Ideally the voltage would be dynamic allowing for the faster charging when the battery is empty and little or no charging when the battery is full.

In today's vehicles the electrical charging, storage and starting systems together allow the vehicle to start. However, if the system is designed with no feedback of its state, failure comes without warning leading to stranded vehicles and expensive vehicle trouble shooting.

The following paragraphs detail the shortcomings of the existing static battery control.

One of the shortcomings of the existing static battery control is the overcharging of batteries. The overcharging of batteries has been shown by engineering tear down analysis to be a predominant cause of early failure for AGM batteries installed in vehicles with a fixed voltage charging strategy. Overcharging of a battery pack occurs when a fully charged pack continues to be charged. In a CV charger this occurs when the battery has an equilibrium voltage which is substantially lower than the vehicle system voltage. Equilibrium voltage varies with temperature and State of Charge (SoC) and it moves lower with high ambient temperature. Liberation of hydrogen gas from the negative plate and oxygen from the positive plate is seen during the charging process. However, when a fully charged battery continues to be charged, due to a float voltage that is too high, thus causing high float current, the energy imparted to the battery causes high rates of gassing. Recombination of these gases is an exothermic process. Internal heating due to recombination drives cell equilibrium voltage lower which increases float current and gassing still further. If the heating caused by excessive float charging exceeds the batteries' ability to dissipate this heat for a long enough duration, the battery enters a condition know as "Thermal Runaway". This positive feedback phenomenon when allowed to continue will cause catastrophic failure of the battery. Failure of one battery within the pack increases reliance on remaining batteries which in turn shortens their life. Short of this catastrophic failure, excessive gassing will exceed the batteries ability to recombine the liberated gases. Internal pressure built by plate gassing will eventually exceed the threshold of the cell's pressure regulation valve. Once this valve opens, "burping" the excessive pressure to the atmosphere, the escaped gases will never be reclaimed. This loss of electrolyte leads to dry out of the fabric separator which is a contributing cause to several failure modes.

Another shortcoming of the existing static battery control is the undercharging of the battery pack. Undercharging of the pack occurs when the energy consumed by loads when the engine is off is greater than the energy that is stored in the battery by the vehicle's alternator during the entirety of the next drive cycle. This phenomenon is referred to as "starvation". Under a static charge strategy the single system voltage of 14.2 V serves as a compromise between minimizing charge time and minimizing float voltage. This compromise ensures longer charge times than what is possible given the charge acceptance of the batteries and the capacity of the alternator.

An additional shortcoming of the existing static battery control is the over discharge of the battery. Cycles seen during the life of the battery is known to correlate strongly to depth of discharge. When selecting a battery for a given application, it will last for a greater amount of cycles if a larger battery is selected as all else being equal the depth of discharge for a larger battery will be smaller. The lead within a battery is mechanically active; when the battery discharges the formation of lead sulphate causes the plates to expand. During charge the lead sulphate crystals are returned to solution causing the plates to contract. Higher DOD is associated with greater mechanical expansion and contraction of the plates which reduces the adherence of the active material to the grid. This is referred to as a "softening" of the active material. Over discharge is currently managed by "shedding" loads when the battery reaches a low SoC. However in current vehicles the determination of low SoC is made through voltage measurements which are known to correlate to SoC with an error of +/−20%. This inaccurate understanding of SoC impedes the system's ability to balance battery calendar life against run time utility as the most conservative load shed points must be chosen to account for the high degree of uncertainty in the SoC voltage measurement. A more accurate understanding of SoC coupled with an assessment of the system loads and use case yields the ability for the system to advise the user when and how long to run the engine of the vehicle, raising the SoC of the battery to a high enough level to allow the battery to last through the user's sleep cycle thus allowing for a more well rested user.

Another disadvantage results from charging the battery outside the State of Function (SoF) envelope. The lead acid battery is a time variant electrochemical system. There are many factors which determine the ability to accept or provide charge at any given time. The amount of charge acceptance which the battery is capable of varies with cell temperature and SoC. At the extremes of temperature it is necessary to limit the current charged to the battery in order to prevent battery damage. In heavy duty vehicles there exist short periods of time where the battery cell temperature reaches these extremes. With system knowledge of the battery's state of function the system could delay charging and prevent battery damage. One such avoidable extreme is cold winter operation where charging could be delayed until engine heat brings the battery into a chargeable range. Another avoidable extreme is hot summer "grade pulls" and idling periods where engine heat and lack of air movement can drive battery box and eventually internal battery temperature past the temperature where the battery can be charged without risking vigorous gassing, dry out and possible thermal runaway. The lack of an accurate understanding of SoC, State of Health (SoH) and temperature means the system designer cannot design the system to only charge within the batteries' SoF. Use outside of SoF is by definition damaging and shortens battery life.

SoC and SoH are internal battery state quantities. Those internal battery state quantities are by definition "latent" and thus unable to be measured via an external sensor. Estimation of SoC is known from prior art. US 2013/0138370 A1 provides a battery SoC estimation method and battery management system. Estimation of SoH is known from prior art as well. US 2010/0244846 A1 describes a method for determining the SoH of a battery.

An additional failure mode of lead acid batteries is sulfation. Sulfation occurs as an integral part of the battery discharge chemical reaction which converts lead to lead sulfate. However when the pack is kept at a low state of charge for long periods of time or it is operated at a partial state of charge, seldom achieving 100% SoC, the smaller lead sulfate crystals on the surface of the negative plates are allowed to aggregate into larger crystals or so called "hard sulfation". It is known that prescribed overcharge, also known as an equalization charge stage, can be employed to break down hard sulfation thus winning back battery electric charge capacity and improving overall pack life. An equalization charge phase is by definition an overcharge of the battery and thus must be both used sparingly and closely monitored to prevent electrolyte dry out and thermal runaway. The lack of an understanding of the individual use case of the battery as well as the lack of ability to precisely control the charge voltage prevents vehicles with a static charge strategy from mitigating sulfation through equalization.

A contributing factor to battery aging and capacity loss is lack of cell balance. An automotive starting and hotel load battery consists of multiple battery cells connected into a series string. The string is connected to the vehicle and other batteries at the negative end of the bottom cell in the string and the positive end of the top of the string. According to Kirchhoff's law the current passing through each series connected cell is equal. If the charging and discharging efficiencies were equal for each of the cells, the change in SoC due to the equal current would also be equal. Batteries used in the automotive environment, however, differ from this ideal. The series string of cells can exhibit different charge/discharge efficiencies due to many reasons including, differences in internal cell temperature due to differing orientation of the cell, manufacturing variance related to the amount of electrolyte present in each cell and varying amounts of current consumed by cell reactions other than the primary charging reaction such as reactions involved with the closed oxygen cycle.

There are several known scenarios in which the shedding of load occurs but high pack current draw persists. In one scenario a load has been placed between the battery and the load shedding switch. In this scenario even with all the loads shed by the automatic system the load still draws upon the battery. In a second scenario the battery continues to be discharged by a load which is necessary for safety, such as exterior lighting. In both these scenarios ideally the most probable source of the load could be estimated by examining the vehicle serial communication bus information. Information such as the DoD and length of time at DoD, otherwise known as load profile, could be relayed to a diagnostics ECU (Electronic Control Unit) which in turn relays the information to a back end telematics server. This information then forms a behavioural loop between the driver, the vehicle and the fleet's management. This additional information about the use patterns for the vehicle's batteries and charging system, also known as powernet function, allows the trucking fleets to encourage proper use scenarios and discourage improper use scenarios.

Methods of charging are known from prior art in order to avoid the failings described above. For example, there is prior art for varying system charging voltage with temperature, known as float voltage compensation.

It is the object of the present invention to provide a reliable and competitive battery management system to enlarge battery life time and to improve failure predictability.

According to the invention, this object is solved by a battery management system, a vehicle as well as a method for charging a battery having the features according to the respective independent claims. Advantageous implementations of the invention are the subject matter of the dependent claims, of the description and of the figures.

The battery management system (BMS) according to the invention can be disposed in a motor vehicle. The battery management system comprises at least one battery having multiple battery cells, an automotive electronic control unit comprising means of sensing battery quantities, wherein the battery quantities are the battery terminal current, the battery terminal voltage and the battery terminal temperature or the temperature of air within or in close proximity to the battery location, and an automotive alternator supplying a regulation voltage. The automotive electronic control unit is adapted to drive the battery through a charging cycle, in which a certain charge voltage and/or a certain charge current is supplied to the battery in order to charge the battery, and the automotive electronic control unit is adapted to control the regulation voltage based upon the sensed battery quantities in order to supply the certain charge voltage and/or the certain charge current to the battery.

Means of sensing current and current sensors, respectively, can be at least one of the following: a copper current shunt which is temperature compensated in firmware, a copper current shunt which is temperature compensated by the addition of a second metal, an analog-to-digital converter measuring the difference in voltage at opposite ends of the current shunt or a Hall Effect sensor. The means of current sensing can be multiplexed across a plurality of conductive paths to be sensed. The multiplexing of a plurality of bus bar shunts allows a plurality of batteries to be managed within one or more packs. In a preferred embodiment there are four parallel connected sensors however it could also be any other number of sensors corresponding to the battery pack(s) installed on the vehicle. Means of sensing temperature and temperature sensors, respectively, can be at least one of the following: a thermistor, a resistive temperature detector, a band-gap, thermopile, IR imaging, or a thermocouple.

There are several aspects of battery sensor design which enhance its accuracy and reduce its cost. The use of a highly accurate data converter allows for a shunt resistance that is half that of standard designs. This low shunt resistance is favourable in minimizing overall resistance of the vehicle charging/starting circuit, allowing for more power to be delivered to the starter during the engine crank event. Classical low pass filters will reduce both noise and signal leading to an unacceptable loss of fidelity which will impede overall system accuracy. An additional aspect of the invention includes the use of a non-linear diffusion filter to remove noise while retaining a greater amount of the signal allowing for an increase in sensor and overall system fidelity.

According to the invention the battery management system controls the charging of the battery as well as, in some configurations, the load shed functions of the vehicle electrical system to increase battery life and predictability of battery pack remaining useful life. The remaining useful life is an estimate of the average time to failure for the battery being considered. Charging is controlled by varying commanded system regulation voltage of the vehicle alternator based on current, voltage and temperature sensors attached to the battery as well as expert information obtained through laboratory testing of the battery being managed. In other words, charge control of the battery pack is achieved by the changes in the commanded alternator regulator voltage set point which affect changes in the voltage seen at or the current flowing through the battery. Those changes in the regulation voltage cause changes of the amperage charged to the battery. The regulation voltage and thereby the amperage charged to the battery are changed through changes according to the resulting voltage and temperature changes sensed by the sensing means. Within this dynamic battery control the battery is driven through the charging cycle. A battery pack driven through a charging cycle according to the invention offers the user the greatest utility while also retaining the greatest capacity. Battery life is extended by avoiding both overcharging and undercharging in an environment with particularly variable temperature. Thus an optimal use of the battery pack can be achieved. For heavy automotive applications the control of charging represents the greatest opportunity for extending battery life. The additional battery life offers a compelling value proposition for the end user as well as the OEM (Original Equipment Manufacturer). The incremental cost of the preferred embodiment added to the cost of vehicle manufacture can be many times less than the reduction in total cost of ownership realized by the addition of the invention.

In a preferred embodiment, the automotive electronic control unit is adapted to provide a first stage within the charging cycle, wherein the battery is charged with a constant charge current with a first amperage to a first state of charge (SoC). Generally, the SoC is defined as the ratio of the stored charge currently available relative to the charge available after a full charge of a certain battery. It is a relative value based on the certain battery at a certain age. SoC is an internal (or latent) state of the battery and is not observable from the outside. The first stage can be denominated as a bulk charging phase, e.g. spanning 0-80% of the SoC. The alternator regulation voltage can be controlled in order to deliver a bulk charging stage in which a constant current is delivered to the battery. In this phase the battery exhibits a high charge acceptance. Thus, the charge current can be maximized at a low state of charge. This decreases charge time which in turn decreases undercharge if the charge sequence is interrupted by the driver shutting down the vehicle engine. The decision to end this stage can be based on SoC estimation or alternately on battery voltage rising past a predetermined threshold. Within this bulk stage, one or more current magnitudes may be used. When the battery voltage resulting from the constant current charge rises past a predetermined threshold a new constant current value approximately half the magnitude of it's predecessor is used. In a preferred embodiment the number of different magnitudes used is four. This number achieves a balance between fast charging, which is advantageous, and heat generation which is known to be damaging. The values used for these constant current magnitudes can be advantageously adjusted with the estimated internal battery temperature to optimize the competing needs of charge time and primary to parasitic charge ratio with the need to not excessively raise the temperature of the battery through heat internally generated through the charging process.

Advantageously, the automotive electronic control unit is adapted to provide a second stage within the charging cycle, wherein the battery is charged with a constant charge voltage to a second state of charge, while monitoring that the battery current stays within a predefined limit. The second stage can be denominated as an absorption phase, e.g. beginning at 80% of the SoC. The alternator regulation voltage is controlled in order to deliver an absorption charging stage in which a constant voltage is delivered to the batteries while monitoring that the battery current stays within predefined, acceptable limits. Generally, in this phase the battery charge acceptance declines. Thus, a relatively high charge voltage is chosen which remains below gassing voltage for the current cell temperature. Absorption mode is controlled by a timer whose duration is proportional to the time duration of the bulk phase and a lower threshold of accepted charge. When the absorption time expires or the battery accepted charge falls below a pre-determined threshold the absorption period ends. Alternately the end of the absorption stage can be based on SoC estimation. As a further advantage of this stage the constant charge voltage of the absorption stage can be adjusted downward with increasing battery temperature. Higher charge voltages have the advantage of creating a better ratio between primary and parasitic reactions within the battery, however when the voltage is too high relative to the battery equilibrium voltage there will be excessive gassing as the plates. Temperature compensation of the charge voltage seeks to balance these competing needs.

Preferably, the automotive electronic control unit is adapted to provide a third optional stage within the charging cycle, wherein the battery is charged with a constant charge current with a second amperage in order to equalize different states of charge of the battery cells. The third stage can be denominated as an equalization phase. The alternator regulation voltage is controlled in order to deliver an equalization charging stage in which a small constant current is delivered to the battery to make cell SoC more equal and reduce sulfation build up upon the negative plate. In other words, the SoC of the battery cells of the battery are balanced. Occasionally the batteries are equalized by charging the battery with a small current until system voltage rises to a certain value allowing for cell equalization and a breakdown of sulfation. Sulfation is optimized against grid corrosion and battery life is extended. It is a further advantage of the design to adjust downward the duration of the stage and the magnitude of current used with increasing temperature. This process is referred to as temperature compensation.

It proves advantageous if the automotive electronic control unit is adapted to provide a fourth stage within the charging cycle, wherein the battery is charged with a charge current which is dependent on the sensed temperature of the battery in order to maintain the second state of charge. The fourth stage can be denominated as a float phase. In the float phase the charge current is set to a level which only replaces what is lost to self-discharge. In this phase system voltage is varied to ensure that the battery current stays at this value. The current charged to the full battery is regulated so that it balances the replacement of self-discharged energy but does not overcharge. In a different embodiment of the invention the fourth stage controls the battery current to zero until such time as the SoC falls below a threshold at which point a new charging cycle is initiated.

In a further embodiment of the invention the battery is charged using two different charge strategies which are interchanged based on determination of system need and or predetermined ratio.

In a preferred embodiment, the first charge strategy is a constant current strategy and the second strategy is a current interrupt charge strategy. The constant current charge strategy is controlled such that the ending SoC of the battery is above 90% but less than 100%, this ensures no overcharge is seen with this method. If this was the only strategy used the battery would soon fail due to undercharging. However if a second method is employed which charges the battery past 100% SoC it imparts overcharge that reverses the decrease in capacity seen during successive charges under the first charge strategy. Dividing the overcharge seen in the second charge strategy by the number of times the first charge strategy was used plus one for the overcharging strategy itself leads to a very low percentage of overcharge per cycle. This method of minimizing both overcharge and undercharge has been shown to increase the total number of cycles performed by the battery prior to failure.

In the first charge strategy of the above two strategy embodiment the automotive electronic control unit (ECU) is adapted to provide a first stage within the charging cycle, wherein the battery is charged with a constant charge current with a first amperage until battery voltage raises to a first battery voltage. At the point of exceeding this first voltage, the ECU initiates a second stage of the constant current charge strategy where a second constant charge current is imparted to the battery at around half the magnitude of the first. This process of halving the current for the successive stage continues until a high state of charge is achieved. Constant current charge regimes can be realized with an arbitrary number of stages, however in a preferred embodiment the optimal number of stages is four. Chargers with less than four stages have longer charge times and a higher amount of heat generation. The final stage of the constant current charge strategy has the smallest magnitude of current at lower charge currents and thus lower charge voltages a greater percentage of the charge current contributes to parasitic side reactions resulting in heat generation. A greater amount of stages allows for less charge time to be expended in the final stage for a given target SoC. This effect of reducing the extent of side reactions and decreasing charge time shows diminishing returns above four stages.

In a preferred embodiment, the automotive electronic control unit is adapted to estimate an internal battery state through use of an equivalent circuit model. The equivalent circuit model is a lumped electrical circuit which approximates the complex electrochemical reactions within the battery with a simple electrical analogy. In order to allow the model to retain accuracy over changes in system load, SoC, and temperature, the embodiment includes a look up table for the values of the lumped circuit elements. The equivalent circuit values are found by recording the voltage response to a current pulse over ranges of battery current, SoC and temperature. The model lumped circuit element values are then varied until the model voltage response most closely matches that which was previously recorded in a battery lab using a physical battery. This process is repeated until a look up table with sufficient resolution to capture the dynamics of the system is assembled. Within the ECU this look up table is consulted at each time step of the model to employ the optimal equivalent circuit values for the system conditions during the time step.

Internal battery state is defined as an understanding of the SoC, SoH, SoF and Remaining Useful Life (RUL) of the concerned battery. The estimation is built upon values obtained from measuring voltage, current and temperature of the battery. These sensors are identical to those needed for the charger and thus can be shared. This internal state of the battery is relayed to the power net controlling ECU(s) to base shedding of hotel loads on battery SoC rather than less accurate voltage measurements. Information regarding battery use is relayed to the vehicle diagnostic systems to be forwarded to the fleet management professional as part of a remote diagnostics regime.

SoH is a relative measure of the capacity of the battery. It's defined as the 100% SoC capacity of the battery at the current point in time over its 100% SoC capacity on the date of manufacture. Due to sulfation, grid corrosion and expansion, and dryout a slow degradation of capacity and increase of internal resistance are experienced over the life of the battery.

SoF is the instantaneous ability of the battery to accept or provide current from/to the alternator or load. These limits dictate the control decisions required to properly manage the battery. The closer control decisions are to the actual SoF the longer the battery life, all else being equal. SoF is estimated as a function of SoC, SoH and temperature.

The equivalent circuit model can be calibrated or adjusted at points in time where the rested voltage can be measured or estimated allowing the look up table to be referenced to obtain the true state of charge of the battery or battery pack. The state of charge of a battery can be calibrated by applying a pulsed current forcing function to the battery whose voltage response is examined in light of the previously characterized function to yield SoC.

Applying a pulsed current forcing function provides one means to yield the capacity, State of Health and Remaining Useful Life (RUL). It can be provided that the estimated RUL and/or the SoC, particularly a low SoC, are displayed to a driver of the vehicle and/or maintenance personnel and/or a fleet manager. Particularly in a sleeper truck, it is possible to alert the user to the need to charge the vehicle batteries before the user goes to sleep such that the charge stored in the batteries is sufficient to power the anticipated load throughout the sleep cycle of the driver. In order to accomplish this, a running average of overnight demand is stored within the device. An average is also drawn of SoC and SoH during the overnight segment. This information yields the total charge available to drive loads through the evening. From both the anticipated load and the anticipated capacity to drive load a shortfall can be made up by the driver charging the vehicle batteries prior to the overnight segment. This advisement is made through the vehicle cluster as a user alert or as information that can be queried though the vehicle cluster menu.

By means of providing the equivalent circuit model the internal battery state can be estimated to properly schedule maintenance charges.

It can be provided that the battery management system has an analogue voltage sense line and/or a serial data bus for controlling the regulation voltage of the vehicle alternator.

A motor vehicle according to the invention comprises a battery management system. Particularly the motor vehicle can be a heavy duty vehicle like a sleeper compartment equipped truck.

In addition, the invention relates to a method for charging the battery having more than one battery cells by driving the battery through a charging cycle. In a first stage of the charging cycle the battery is charged with a constant charge current with a first amperage to a first sate of charge (SoC), in a second stage of the charging cycle the battery is charged with a constant charge voltage to a second state of charge, while monitoring that a battery current stays within a predefined limit, in a third stage of the charging cycle the battery is charged with a constant charge current with a second amperage in order to equalize different states of charge of the battery cells, and in a fourth stage of the charging cycle the battery is charged with a charge current which is dependent on a sensed temperature of the battery in order to maintain the second state of charge.

The preferred embodiments presented with respect to the battery management system according to the invention and the advantages thereof correspondingly apply to the motor vehicle according to the invention as well as to the method according to the invention.

Further features of the invention are apparent from the claims, the figures and the description of figures. All of the features and feature combinations mentioned above in the description as well as the features and feature combinations mentioned below in the description of figures and/or shown in the figures alone are usable not only in the respectively specified combination, but also in other combinations or else alone.

Now, the invention is explained in more detail based on a preferred embodiment as well as with reference to the attached drawings.

DETAILED DESCRIPTION OF THE DRAWINGS

Figure 1:
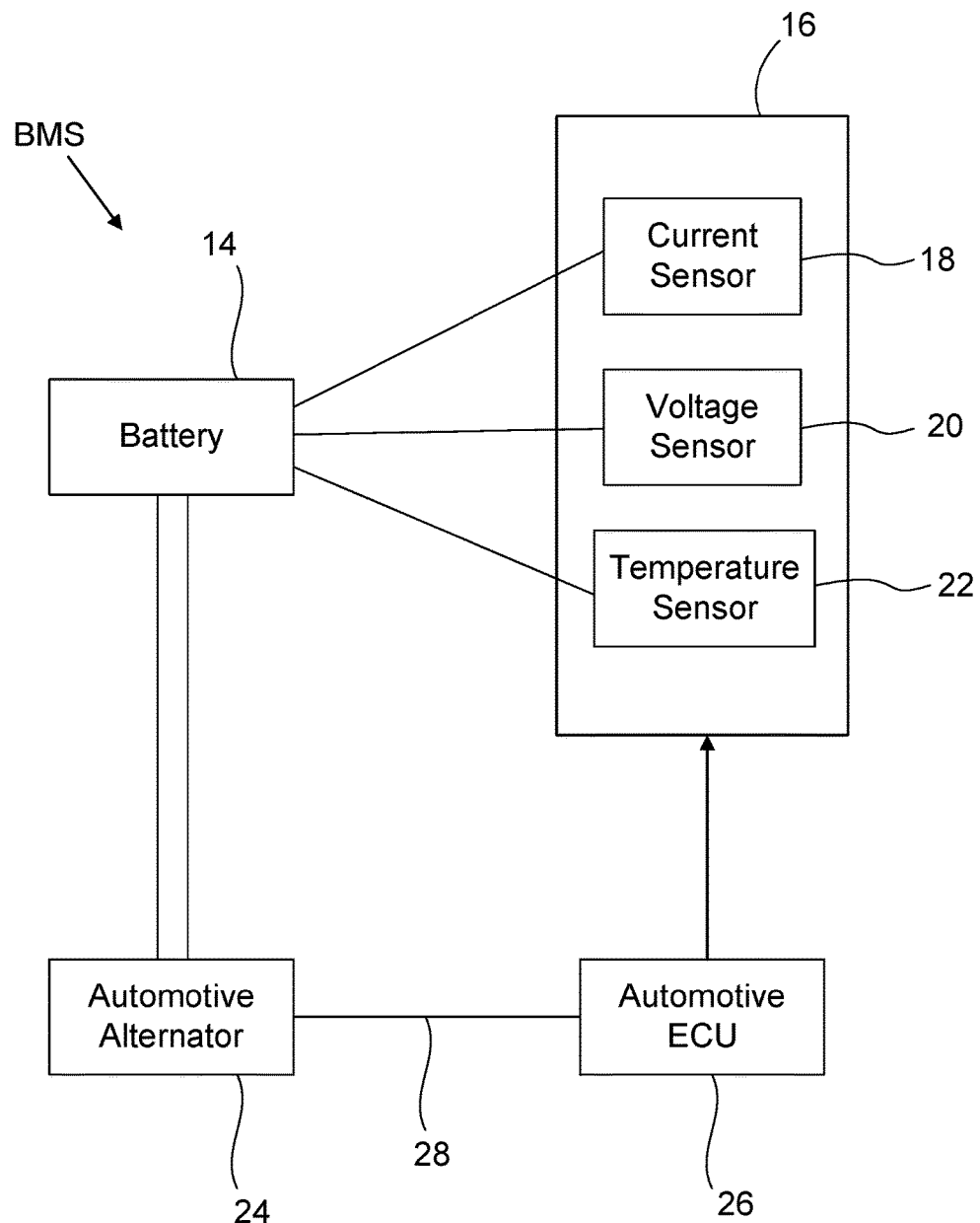
FIG. 1 is a schematic illustration of an embodiment of a battery management system according to the invention.

In the figures, identical or functionally identical elements are provided with the same reference characters.

FIG. 1 shows a schematic illustration of a battery management system (BMS). The BMS can for example be disposed in a motor vehicle (not illustrated here). The motor vehicle can be a passenger car, a class 6-8 vehicle or a heavy duty vehicle like a truck. The BMS has a battery 14, an automotive alternator 24 and an automotive electronic control unit 26. The battery 14 can be a battery pack comprising a plurality of battery cells. The battery 14 can be a 12V lead acid battery with six individual cells that are arranged in a series string.

The automotive electronic control unit 26 is electrically connected to the automotive alternator 24. The automotive alternator 24 provides an alternator regulation voltage which is controlled by the automotive electronic control unit 26 via a line 28. For example, the line 28 can be an analogue voltage sense line or a serial data bus. The automotive electronic control unit 26 comprises a current sensor 18, a voltage sensor 20 and a temperature sensor 22. The current sensor 18, the voltage sensor 20 and the temperature sensor 22 are configured to measure external battery quantities like battery current, battery voltage and battery temperature.

By means of the measured air temperature within the battery box surrounding the battery, the internal temperature of the battery is modeled as a function of a histogram of battery current (charge/discharge), the temperature difference between the estimated cell temperature of the battery and the outside air, the instantaneous thermal resistance between the interior of the battery cell and the air temperature within the battery box surrounding the battery, the instantaneous thermal resistance between the battery cell whose internal temperature is being estimated and its neighbouring cells, and vehicle ambient temperature obtained from a sensor installed on the vehicle. This previously established transfer relationship allows for a much more accurate understanding of internal battery temperature which in turn improves system accuracy with regard to estimation of internal battery state. Internal battery state is known to be highly dependent on internal cell temperature.

Due to the high influence of battery voltage upon the estimation of the internal state of the battery a high precision battery reference is realized via a "kelvin" connection to the positive terminal of the battery. This allows for a minimization of voltage drop across the resistance of the battery reference wire.

Based upon the sensed battery quantities the automotive electronic control unit 26 is adapted to drive the battery 14 through a charging cycle, in which a certain charge voltage and/or a certain charge current is supplied to the battery 14. The automotive electronic control unit 26 is configured in controlling the regulation voltage.

Figure 2:
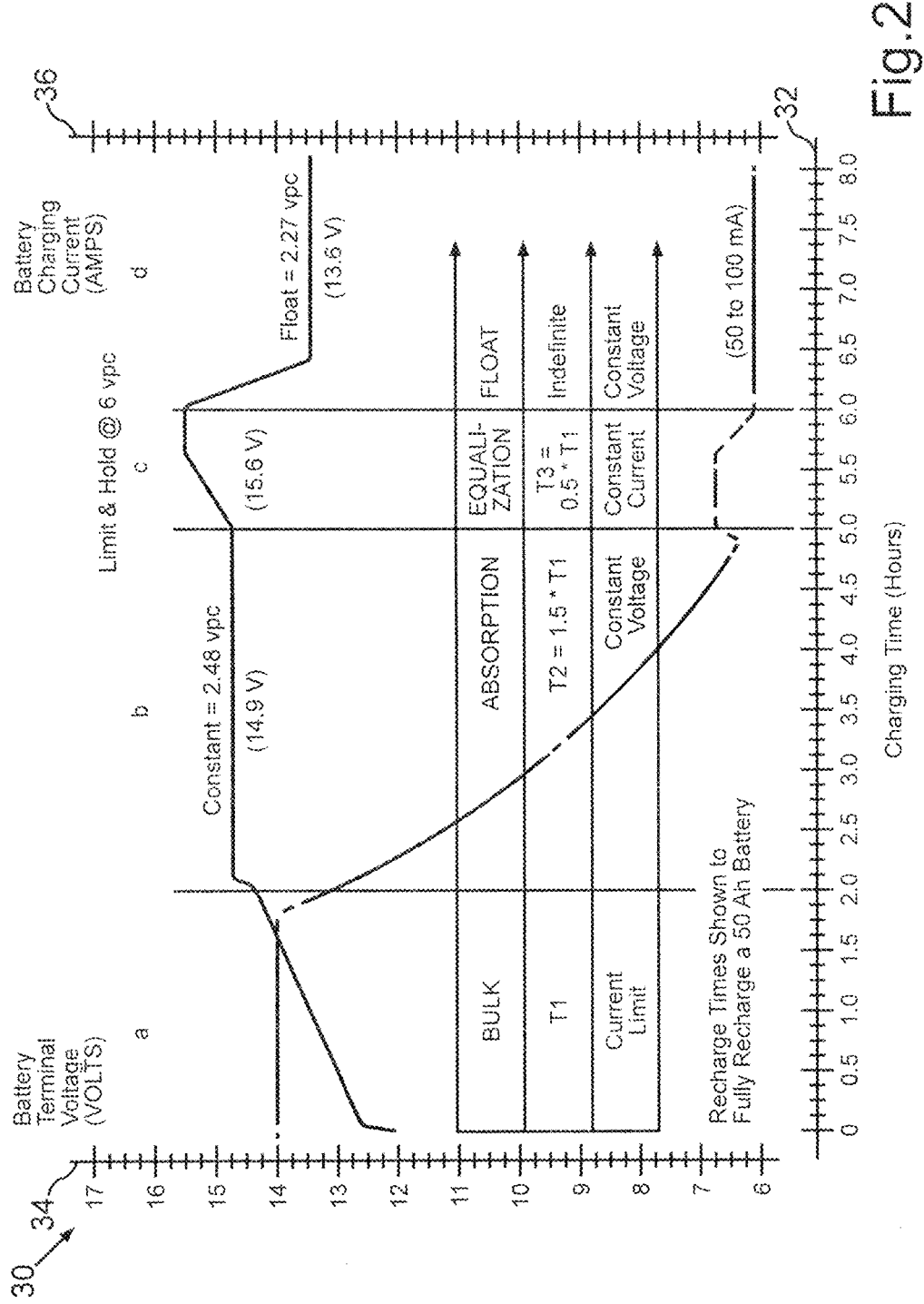
FIG. 2 is a schematic view of a four stage charging cycle.

FIG. 2 shows the charging cycle by means of a graph 30. In this case, a 50 Ah battery should be fully recharged. On the abscissa 32 the charging time is plotted. On the left-hand ordinate 34 the voltage level of the measured battery terminal voltage is plotted, and on the right-hand ordinate shows the amperage of battery charging current supplied to the battery 12 is plotted.

The continuous line shows the measured battery terminal voltage and the dashed line shows the charging current supplied to the battery 12. The charging cycle is graduated in four stages a, b, c and d. For charging the battery 12 the automotive electronic control unit 26 drives the battery through three or four stages. The decision between the two is determined by the amount of battery cycles which have been seen since the last four stage charge. Additionally if a loss of capacity is witnessed this will trigger the decision for a four stage charge as well. The four stages a, b, c and d are as follows:

The first stage a is a bulk charging phase spanning 0-80% SoC. The battery exhibits a high charge acceptance, thus allowing current levels supplied to the battery to become a function of alternator size and efficiency as well as engine over speed. During this mode the amount of current supplied to the battery is flat while the battery voltage rises. The System voltage is regulated by the BMS such that the constant current charge is achieved.

The second stage b, the absorption phase, is entered when the battery voltage rises past a threshold an absorption phase. Beginning at 80% SoC, the battery charge acceptance declines. In this phase a relatively high charge voltage is chosen which remains below gassing voltage for the current cell temperature. Absorption mode is controlled by a timer whose value is 1.5 times the duration of the bulk phase. When the absorption time expires or the battery current falls below a pre-determined threshold the absorption period ends.

The third stage c is an equalization phase. Within a 12V lead acid battery there are 6 individual cells. These cells are arranged in a series string. Due to temperature differences between these cells, their efficiency in accepting charge varies. This sets up the scenario of one or more cells becoming fully charged before the others in the series string. The equalization phase allows the battery to accept a small amount of current for a long period of time with battery voltage floating up to a high level, e.g. 15.6V, or alternately a constant voltage mode can be used setting the charge voltage high and allowing the current to decrease slowly as battery voltage rises. This phase represents a controlled over charging of certain cells and thus must be used sparingly. In addition to the equalization of individual cell SoC the overcharging of the plates acts to reverse sulfation at the negative plate before hard sulfation can result. This cycle helps regain lost battery capacity. An algorithm which determines the need for this optional phase is executed based upon the use of the battery pack.

The fourth stage d is a float phase. In the float phase the charge current is set to a level which only replaces what is lost to self-discharge. In this phase, system voltage is varied to ensure that the battery current stays at this value. Changes in cell temperature will dictate changes in system voltage through the increase or decrease of battery current. These changes are monitored by the current sensor present on each battery within the pack.

In the following, the estimation and calibration of internal battery states, particularly the estimation of SoC and SoH, is explained.

The State of Charge (SoC) is the ratio of the instantaneous capacity of the battery over the capacity that this battery possesses when fully charged. This ratio is expressed as a percent. An analogy would be how full a fuel tank is as a percentage. Estimating state of charge is a critical part of battery control, as the battery is observed to have vastly different behaviour over its SoC range.

The SoC of a lead acid battery may be obtained via an OCV measurement and a previously generated look up table which associates battery open circuit voltage with SoC. This measurement may be made from the battery terminal only if the battery has been in an open circuit condition for a period long enough to allow diffusion to counteract the various factors which obscure the OCV SoC relationship. When the battery is put to use, either accepting or providing charge, the ability to use the OCV to SoC relationship is lost. This is due to a variety of factors including temperature, internal resistance, surface charge and charge carrier gradient.

The open circuit voltage of a fully charged battery will vary inversely with temperature, increasing with lower temperatures and decreasing with higher temperatures. The internal resistance of the battery will act to skew the measured voltage under battery use. If the battery is being charged the internal resistance will act to raise the voltage of the battery above what it would be if it was rested. Alternately if the battery is under discharge it will appear to have a lower voltage than what it would be if it was rested.

Lead acid batteries store electrical energy through electrochemical reactions. The reactions occur between the electrolyte and the electrode only at the surface of the electrode. When a battery is accepting current the charge is gathering at the surface of the plate. Time is required to allow this high concentration of charge to diffuse into the solid plate. Thus if a battery was recently charged the surface charge now present on the plates will skew the measured terminal voltage higher than the average of the interior of the plates. When the battery is rested the process of diffusion allows the surface charge to be equally distributed throughout the plate.

SoC estimation by any algorithmic method is essentially open loop as there is no feedback from the actual SoC value which can serve to reduce the error present in the estimated answer. Any error present in the measurement of the estimator's inputs (voltage, current, and temperature) or in the calculations of the algorithm will accumulate in the SoC estimation value. As the portion of error grows eventually it will dominate the SoC estimation and the system will undergo "state inversion" in which the estimation is so far off as to be the opposite of the true value.

To counteract the above fact the open loop estimator must be periodically calibrated or adjusted. Opportunities to calibrate the system include obtaining a full battery charge; obtaining a rested battery pack OCV reading and converting it to SoC via the previously characterized relationship; and using the voltage response to a two pulse current forcing function converted to SoC via the previously characterized relationship.

Figure 3:
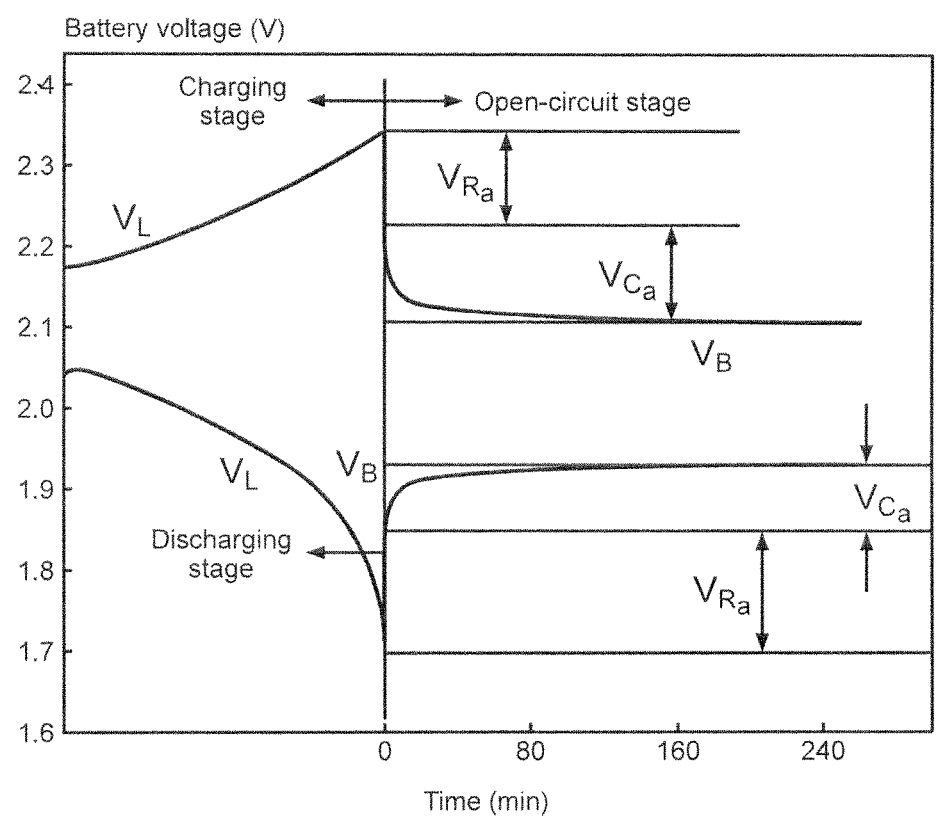
FIG. 3 is graph of a measurement of a terminal voltage of a battery during an open circuit event following a charge and a discharge.

A rested open circuit voltage is defined as the voltage the battery obtains after removal from significant charge or load for many hours. A histogram of battery voltage following removal of load or charge is referred to as a voltage relaxation curve. To obtain an estimate of the rested open circuit voltage, a model according to the invention is employed which predicts the eventual OCV through previously characterizing the recovery curve from a known previous battery state (charge or discharge) and magnitude. The recorded previous state of the battery can be used along with the recovery curve seen thus far and its derivative to predict where this curve will flatten thus revealing OCV. It can be, shown that this practice can estimate OCV with minimal error much sooner than waiting for diffusion to settle the battery terminal voltage. In FIG. 3 the upper signal shows the measured terminal voltage V of the battery during an open circuit event following a charge. The signal recovers downward to the OCV. As well in FIG. 3 the bottom signal shows the battery terminal voltage following a discharge. The voltage V recovers upward toward the OCV.

Figure 4:
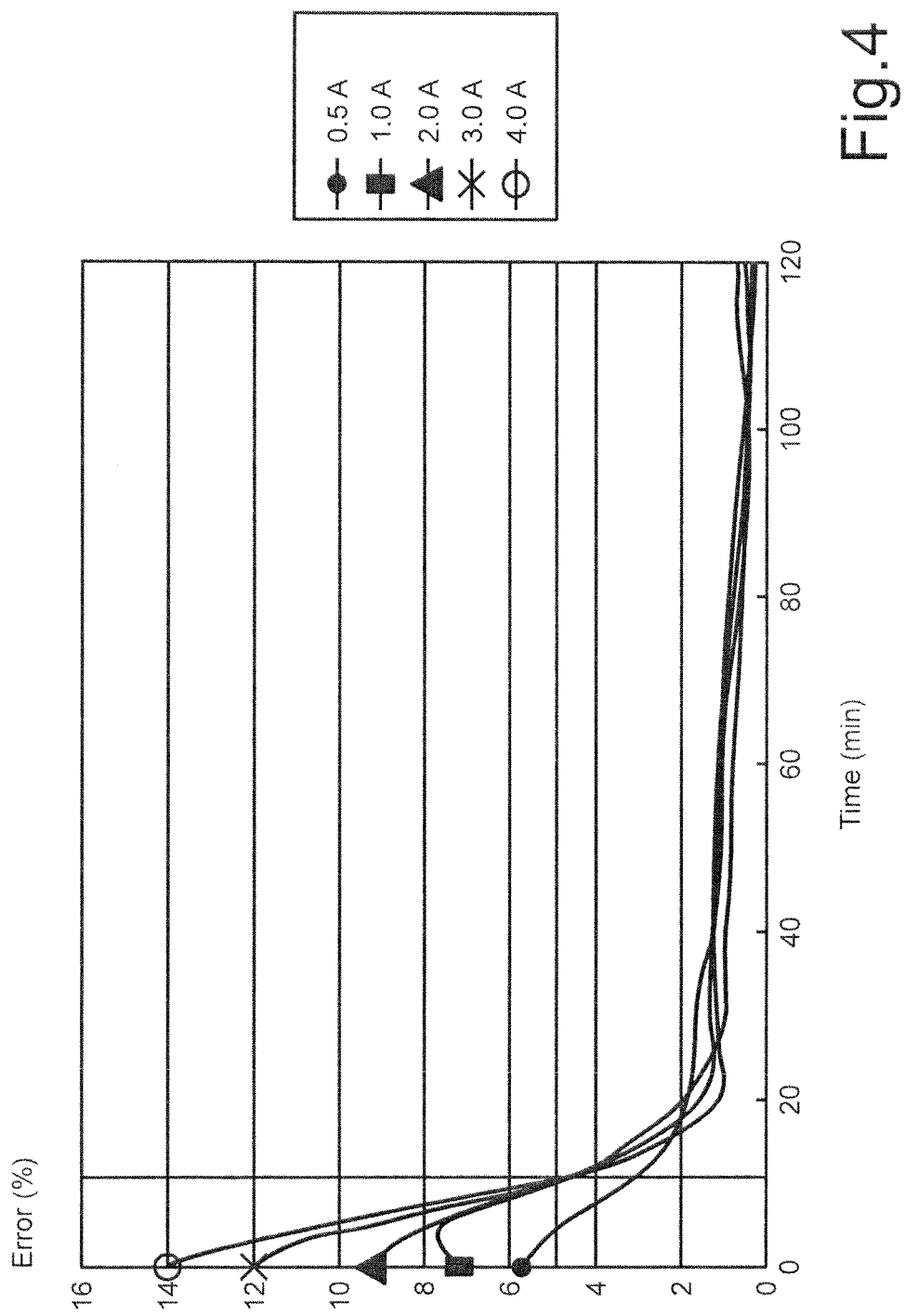
FIG. 4 is a graph of the error percentage for each passing minute of an open circuit voltage (OCV) estimation algorithm.

FIG. 4 shows a graph of the error percentage (Error (%)) for each passing minute of an OCV estimation algorithm which uses the previous battery current and the recovery curve seen thus far to estimate it's end at the OCV. Here, after 20 minutes of data, the algorithm maintains at least a 98% accuracy.

Another SoC calibration algorithm is explained in the following. This algorithm can be used when the vehicle is in use for extended periods of time thus measurement of quasi open circuit battery voltage is not possible.

Figure 5:
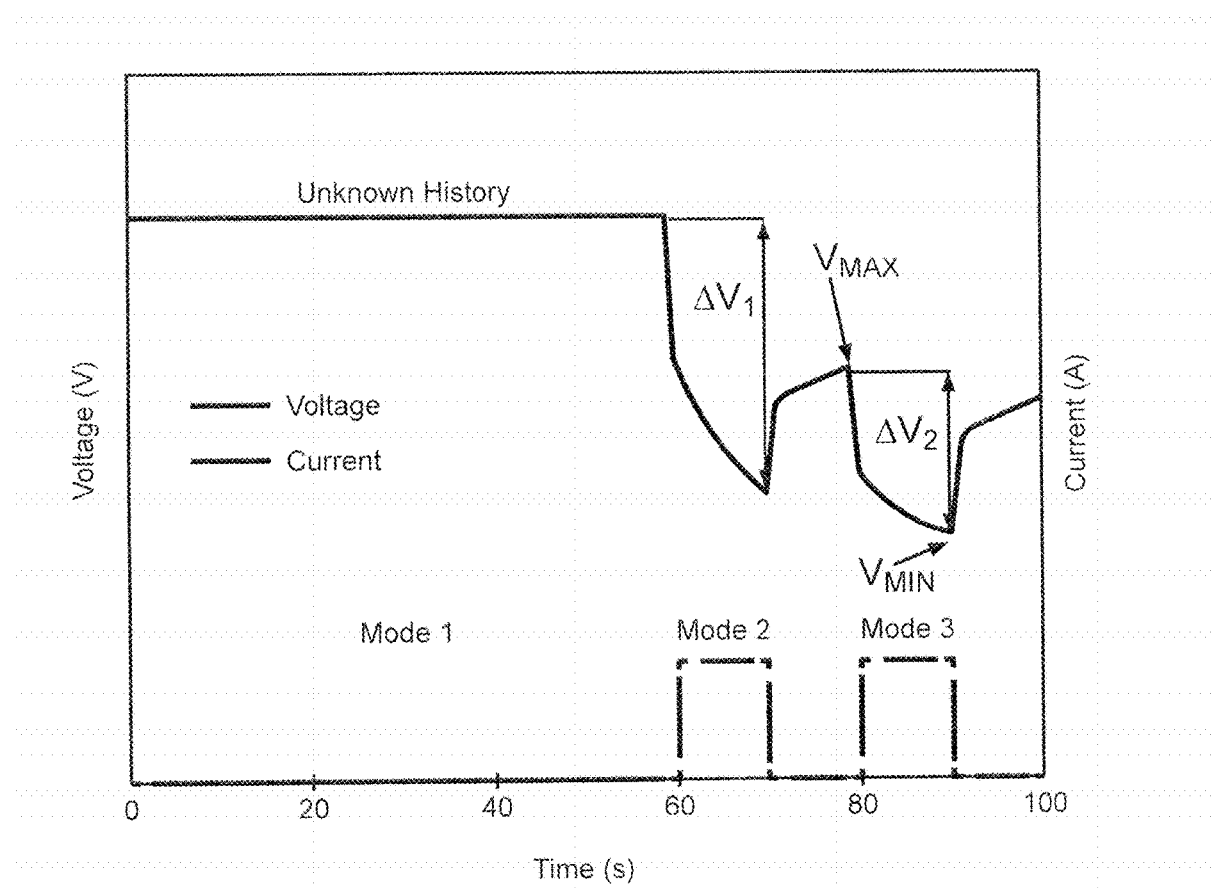
FIG. 5 is a graph exemplifying a voltage response to a current forcing function.

FIG. 5 shows the relationship of the maximal battery voltage $V_{MAX}$ to the electromotive force (EMF) voltage can be known through previous characterization in a battery laboratory. The EMF voltage is the voltage which the battery will recover to more than 24 hours after an open circuit event. This voltage holds a direct relationship to battery SoC. When this value is found through a look up table it can be used to find the SoC through the following relationship:

$$V_{EMF} = \alpha SoC + EMF_{MIN}$$

The slope inclination a and the minimal EMF voltage $EMF_{MIN}$ are found from manufacturer's data sheets relating EMF voltage to SoC. $EMF_{MIN}$ is typically around 11.4V, $\alpha$ is typically 0.018 V and SoC is expressed as a percent. It may be found that $V_{EMF}$ relates to $V_{MAX}$ by a constant offset of 0.24 V ($\beta$)+/−0.06V for VRLA batteries. $V_{EMF}$ can be written as follows:

$$V_{EMF} = V_{MAX} + \beta, \text{ wherein:}$$

$V_{MAX}$ can be measured and added to the design time calculation of $\beta$. Thus SoC is found as:

$$SoC = \frac{V_{MAX} + \beta - EMF_{MIN}}{\alpha}.$$

The values of $\alpha$ and $\beta$ are specific to the particular battery being managed and are found at design time.

The SoC estimation algorithm is explained in the following: As stated SoC is a value which is not readily measurable while the battery is in use and thus should be estimated. The classical solution to SoC estimation is a book keeping method known as coulomb counting. In this method the battery is treated as an ideal storage device for charge. Coulombs of charge imparted to the battery are perfectly accumulated and coulombs of charge supplied by the battery to a load are perfectly supplied. In reality charge and discharge efficiencies are continuously varying. Coulomb counting is a vast simplification of a very complicated electrochemical system. Alternately at the other end of the spectrum there are simulation systems which model the battery electrochemical function on a molecular level. Simulations of this depth are expensive both in development time and in the level of hardware necessary to run such a simulation on the vehicle. A middle ground in which the internal functions of the battery are simplified to a resolution necessary only to accurately estimate the internal state of the battery offers a compelling alternative to either extreme approach.

According to the invention a battery state estimator appropriate for execution by a low cost embedded microcontroller is used. Within the algorithm an equivalent circuit is simulated which represents an electrical analogy to the electrochemical processes governing the behaviour of the battery.

Figure 6:
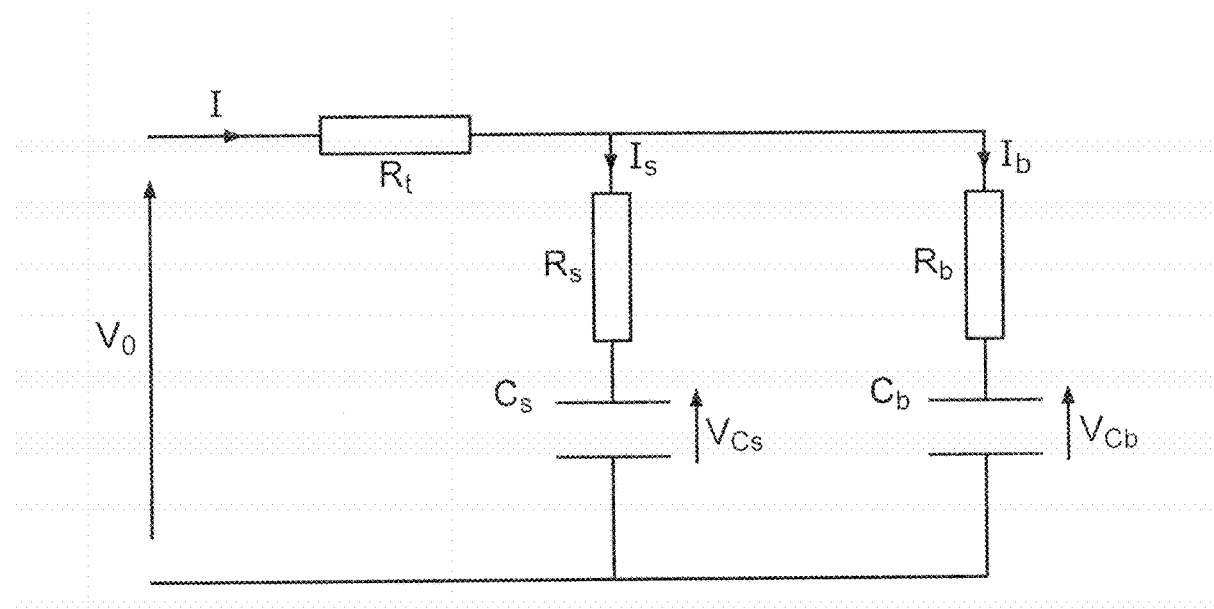
FIG. 6 illustrates an equivalent circuit model with elements which model the behaviour of internal electrochemical process of a battery.

FIG. 6 shows an equivalent circuit model 38 with elements which model the behaviour of the batteries' internal electrochemical process. The model comprises of two storage devices, the bulk capacitor $C_b$ and the surface capacitor $C_s$. The bulk capacitor $C_b$ represents the overall energy storage of the battery while the surface capacitor $C_s$ represents the dynamic surface charge phenomenon. Furthermore, the model comprises of three resistances, the terminal resistance $R_t$, the surface resistance $R_S$ and the bulk resistance $R_b$.

The equivalent circuit exists as two entities. One is the circuit analysis equations necessary to mathematically compute the charge imparted or removed from $C_b$ and $C_s$ within the circuit given the ohmic value of the three resistors $R_O$, $R_S$ and $R_b$. The second is a look up table which stores the previously computed values for the virtual circuit components themselves. This allows the model to retain accuracy despite changes in battery temperature, battery current and SoC.

The relationship of $C_b$ and $C_s$ to overall SoC is defined below.

$$SoC_2 = \frac{1}{21}[20SoC_{C_b}(k) + SoC_{C_s}(k)], \text{ where}$$

$$SoC_{C_b}(k) = F_{OCV-SoC}(V_{bk}) = F_{OCV-SoC}(x_k(1)),$$

$$SoC_{C_s}(k) = F_{OCV-SoC}(V_{sk}) = F_{OCV-SoC}(x_k(2)), \text{ and}$$

$F_{OCV-SoC}(\cdot)$ is the function mapping OCV to SoC. This relationship between OCV and SoC is predetermined through laboratory testing of the managed battery.

The circuit analysis equations governing the equivalent circuit are well known. The voltages $V_{Cb}$, $V_{Cs}$ of the two capacitors $C_b$ and $C_s$ and the voltage $V_O$ comprise the state variables necessary to gain an understanding of SoC and SoH. Their mathematical relationships to the resistances are shown below.

$$V_O = IR_f + I_b R_b + V_{Cb},$$

$$V_O = IR_f + I_s R_s + V_{Cs},$$

which when combined and simplified yield:

$$I_b R_b = I_s R_s + V_{C_s} - V_{C_b}.$$

Kirchhoff's laws state that total current is equal to the two branch currents.

$$I = I_b + I_s, \text{ so}$$

$$I_b(R_b + R_s) = IR_s + V_{C_s} - V_{C_b}.$$

Assuming a slow change in $C_b$, this can be rearranged to:

$$\frac{dV_{C_b}}{dt} = \frac{-V_{C_b}}{C_b(R_b + R_s)} + \frac{V_{C_s}}{C_b(R_b + R_s)} + \frac{IR_s}{C_b(R_b + R_s)}.$$

Similarly for the surface capacitor it is obtained:

$$\frac{dV_{C_s}}{dt} = \frac{-V_{C_s}}{C_s(R_b + R_s)} + \frac{V_{C_b}}{C_b(R_b + R_s)} + \frac{IR_s}{C_s(R_b + R_s)}.$$

By understanding the voltage $V_{Cb}$ and capacitance of $C_b$ total farads of charge which yields SoC via the previously characterized relationship can be obtained. We now have a simple model which provides a running understanding of SoC until the next available calibration point.

The component values in the equivalent circuit simulate phenomena which have a high dependence on cell temperature, SoC and battery current. To accurately simulate the battery the component values of the equivalent circuit model must change with changes in temperature, SoC and battery current. Accurately knowing these component values at design time and packaging them in a look up table appropriate to the embedded environment is a prerequisite for the equivalent circuit model producing an accurate estimation of SoC, which can scale over these changes in temperature, SoC and battery current. These resistance values are obtained by measurement of pulse performance of the particular battery model which will be managed by the system.

Figure 7:
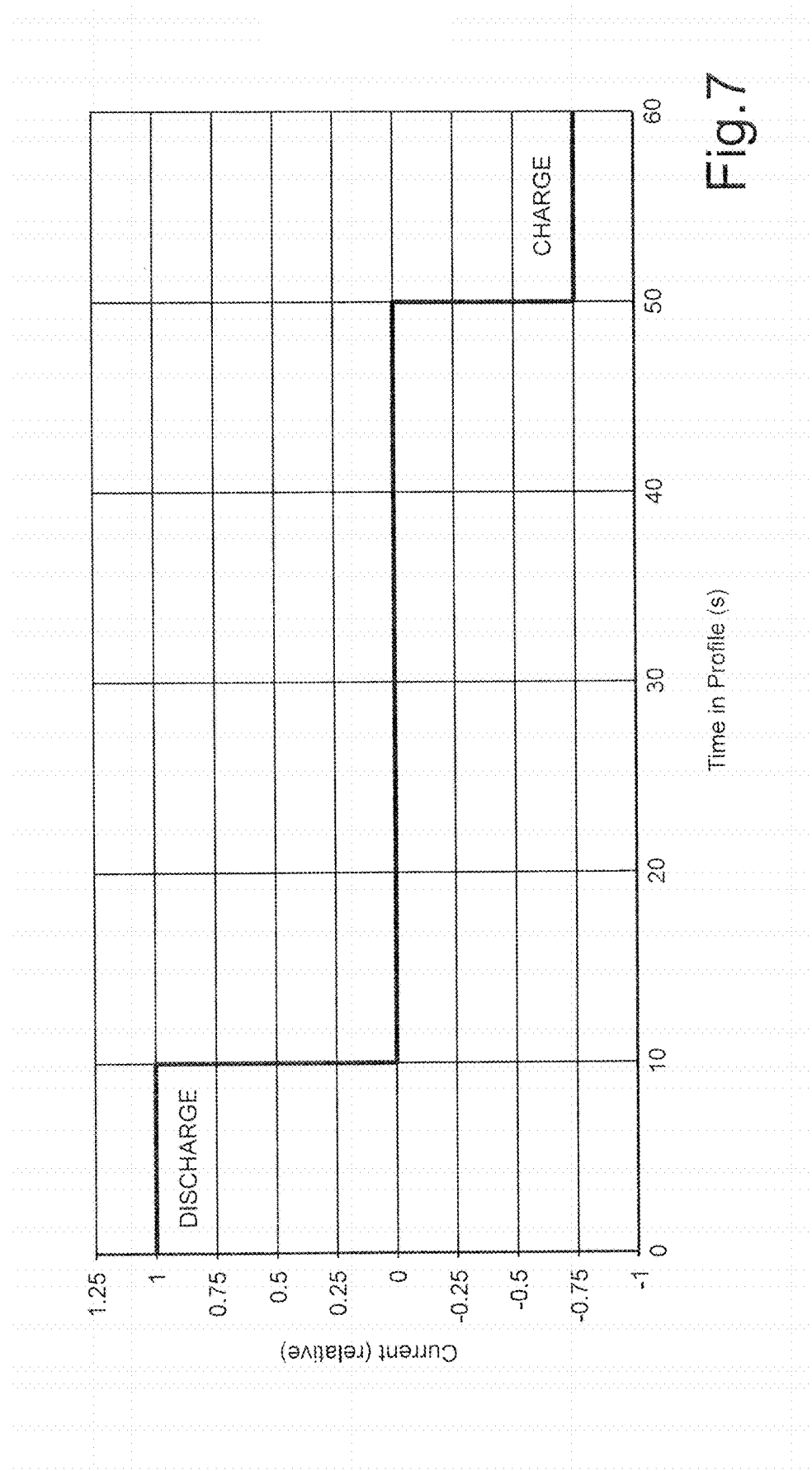
FIG. 7 is a graph exemplifying a function of a pulse of discharge and charge.

FIG. 7 shows a pulse of discharge and charge. The pulse of discharge and charge is imparted to the battery at a plurality of temperatures and SoC levels and magnitudes. For each of these measured pulses the component values of the model for that particular temperature and SoC are found through an optimization process in which randomly selected component values are refined by changing them to reduce error between the simulated current-to-voltage relationship of the pulse and that which was measured in a lab using the physical battery. Once minimal error is reached, the so called global minima, we have found the component values for this point in the spectrum of temperature and SoC. This process is repeated for each point until the lookup table is formed in its entirety.

While a large improvement over coulomb counting the equivalent circuit model described here is still an open loop method which means errors in measurement and computation add to each other and total error will increase over time. In time error will grow in proportion to the signal. To manage the ever accumulating error component of an open loop SoC estimator a plurality of different methods are employed. In one embodiment an adaptive method which uses the difference between the measured battery terminal voltage and the simulated terminal voltage provided by the model to drive an adaptive filter is used to minimize error in the SoC estimate. In a preferred embodiment this process filter is an H ∞ filter or Min/Max filter. However Kalman filters and their evolutions such as extended Kalman and robust Kalman will also yield similar improvements.

In the following the SoH estimation algorithm is described. During its useful life a battery is known to decrease in capacity. The capacity listed on its ID plate is the design capacity and is validated at the end of the battery manufacturing line. State of Health (SoH) is a percentage value expressing the ratio of the present capacity of the battery, over the capacity of this battery on its date of manufacture.

According to the invention two methods of tracking SoH are employed which have varying windows of availability as well as varying accuracy. The short term test runs at every SoC calibration point. The longer term test is run at every battery cycle but also when the short term test sees enough entropy, or change in the system to warrant running the long term test.

In the short term SoH test the equivalent circuit bulk capacitor stored charge as measured in farads is recorded at the calibration points of the system. By subtracting the charge stored at point n−1 from point n the change in charge can be calculated. Put another way this yields the difference in farads of charge seen on the bulk capacitor between the two points of known SoC. The charge expected from various new and aged batteries has been previously characterized and used to populate a look up table that enables the embedded system to convert the actual charge seen between the two points into the estimated capacity, this is further computed into SoH by comparison to original ID plate-indicated capacity of the battery.

In the long term method, a current forcing function is imposed on each battery in the pack. By measuring current seen through the current shunt sensor the system control is capable of varying the commanded system voltage of the alternator such that a given load can be fully switched between the alternator and the batteries. A PID or MPC controller is utilized to accomplish this function. The target current function of the battery is the current forcing function. By commanding this current from the battery the resultant voltage response of each individual battery to the forcing function can be seen in the history of the commanded system voltage.

Referring to FIG. 5 an example of the voltage response of a single battery to this forcing function is shown. From the voltage response to this forcing function the value ΔV2 may be measured.

$C_R$ is the normalized current per unit of Amp Hour Capacity (AHC).

$$C_R = \frac{I}{AHC}$$

$\Delta V_2$ is the peak to peak difference between the recovery voltage after the first pulse and the bottom of the voltage drop of the second pulse. A linear relationship is found between $C_R$ and $\Delta V_2$, this relationship is quantified by the coefficients δ and γ. Through previous battery laboratory characterization the relationship between $C_R$ and $\Delta V_2$ is graphed and the empirical coefficients δ and γ are found through least squares analysis. Through the graph of FIG. 5 it is seen that there is a linear relationship as follows:

$$C_R = \delta \Delta V_2 + \gamma,$$

where $C_R$ can be computed through the following equation:

$$AHC = \frac{I_P}{C_R}$$

where $I_P$ is the current of the forcing function pulse where $\Delta V_2$ was computed. This allows SoH to be expressed as $$SoH = \frac{AHC_{Aged}}{AHC_{NOM}},$$

where $AHC_{Aged}$ is the amp hour capacity of the aged battery and $AHC_{NOM}$ is the amp hour capacity of the battery on the date of manufacture otherwise know as the plate capacity.

Figure 8:
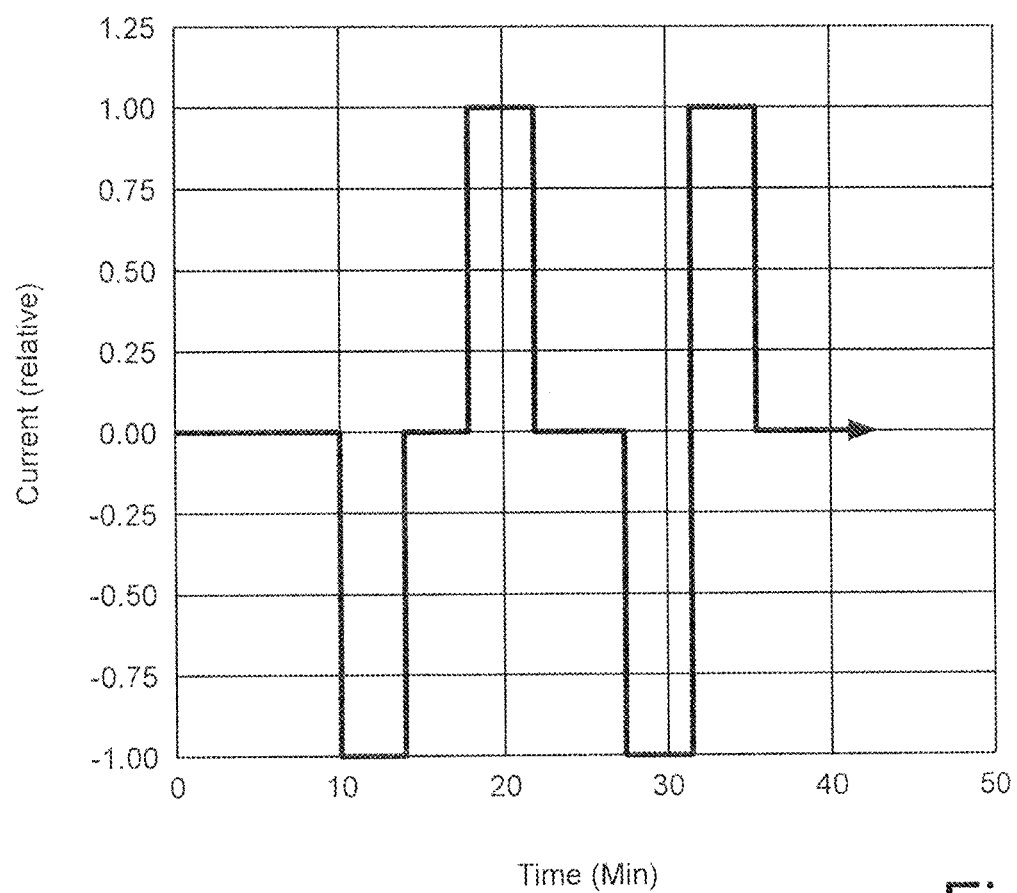
FIG. 8 is a graph exemplifying a current forcing function.

FIG. 8 shows a forcing function in another embodiment of the invention. The forcing function is a low frequency pulse train (LFPT).

Figure 9:
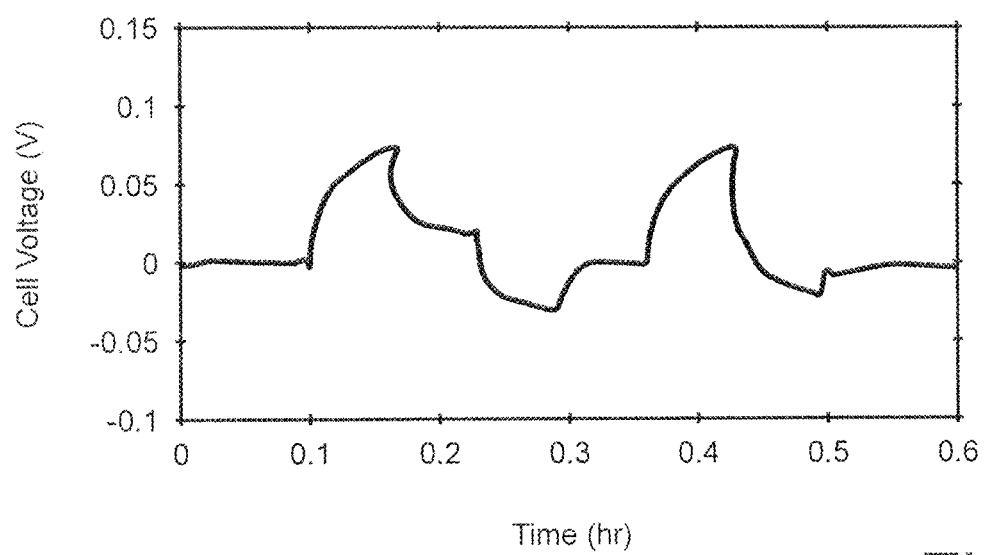
FIG. 9 is a graph exemplifying the voltage and charge current of a current interrupt charge strategy.

FIG. 9 exemplifies the voltage response to the function according to FIG. 8. The LFPT is a period of charge and discharge forced on to the battery pack during a twelve minute period. SoH is found in much the same way as for the shorter forcing function above, using the equations gained above.

Figure 10:
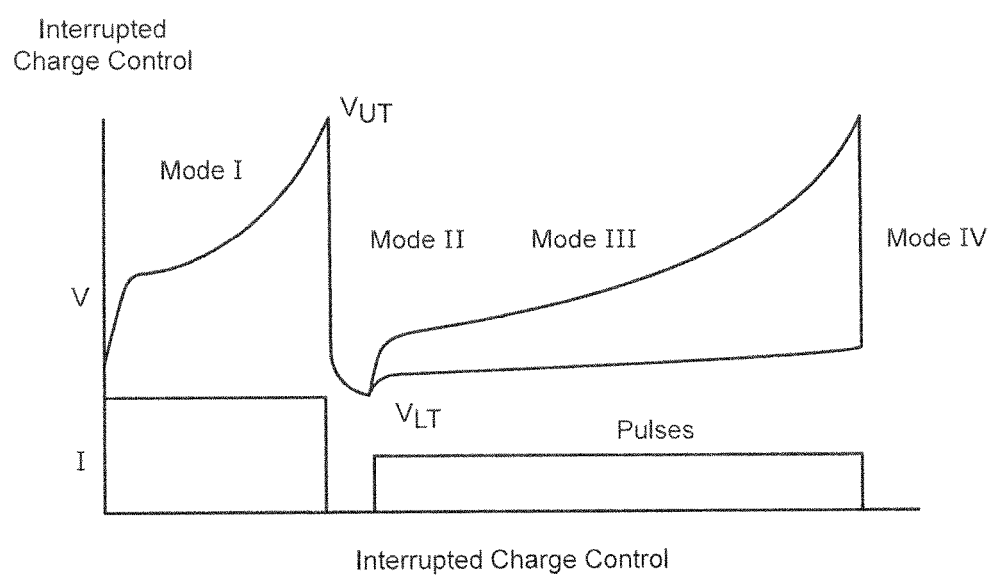
FIG. 10 is a graph detailing the derating of battery float voltage given changes in battery temperature in a battery charge strategy ending in a constant voltage float stage.

FIG. 10 details the current and voltage functions of a current interrupt charger. Mode 1 shows the first stage of the strategy in which a current near 0.1 C is charged to the battery until the battery voltage response reaches $V_{UT}$ (upper threshold voltage of first stage), a temperature compensated threshold voltage which signals the end of Mode 1. In Mode 2 current into or out of the battery is minimized. This allows "over potential" of the cell to be dissipated. In Mode 3 the battery is charged with a current pulse near 0.05 C. The pulse nominally lasts 30 seconds and is followed by a resting period of nominally 30 seconds. The duty cycle, the relationship between the "on" portion and "off" portion of a periodic pulse, is varied with temperature reducing the "on" time of the pulse at warmer temperatures and increasing at lower temperatures. Mode 3 is continued until the battery is charged past 100% SoC and begins receiving overcharge. A prescribed amount of overcharge is imparted to the battery by either feedback from the ongoing SoC estimation or use of a ceiling voltage. Individual pulses are ended either by a maximum "on" time given the temperature, a maximum voltage the pulse is allowed to drive the battery to given the estimated internal temperature, or both. In Mode 4 the battery is fully charged and current to the battery is held at a minimum. Mode 4 ends when it is determined that SoC has fallen below a lower threshold or a predetermined duration of time has expired. Taken together the 4 stages of the current interrupt charger have advantages for management of the battery. Firstly it allows for a controlled overcharge of the battery, this ensures that the battery is fully charged while minimizing the amount of overcharge. Secondly the use of periods of charge and rest in mode 3 allow for a higher ceiling voltage to be used during the period of charge. This higher voltage provides for an advantageous ratio of the primary charge reaction to the parasitic side or what can be called secondary reactions. The higher voltage allows for a greater extent of primary reaction and a lesser extent of secondary reactions. The rest periods allow for this to happen by providing for a relaxation of cell polarization. In this way higher ceiling voltages can be used without risking the high gassing rates that would be present if these higher ceiling voltages were used without rest periods. Additionally these rest periods allow for less temperature rise due to exothermal battery reactions by spreading these reactions over a greater period of time. The above advantageous ratio of primary to secondary reaction has the added benefit of charging the series connected cells of the battery with less variance in the SoC between cells. Once again this advantage is owing to the effect of using higher voltage ceilings.

Figure 11:
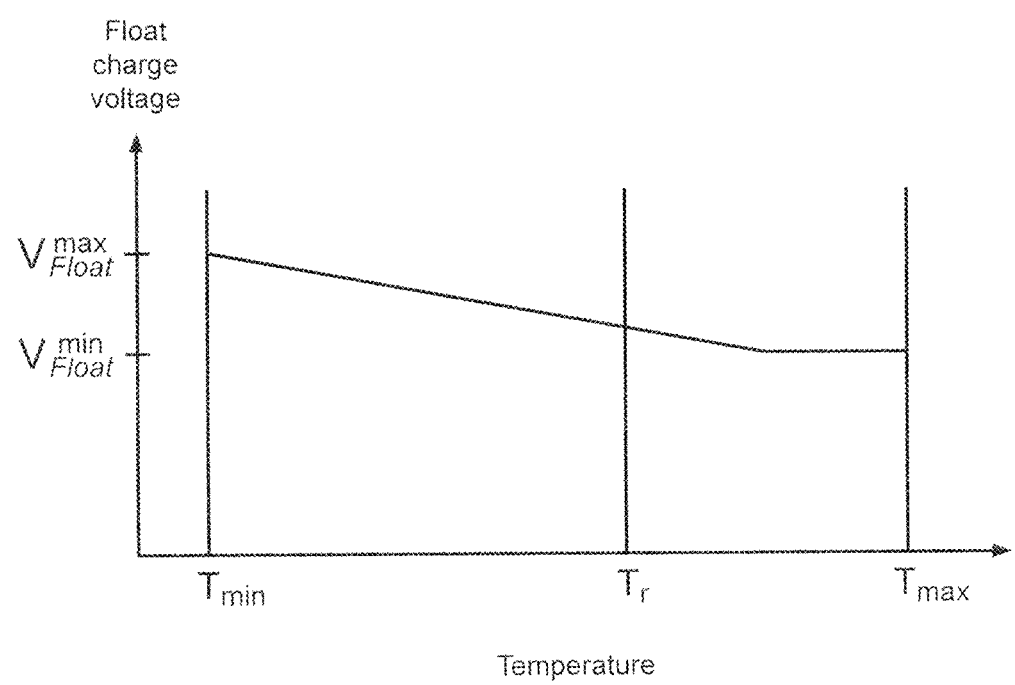
FIG. 11 is a graph detailing the change in ceiling voltage in a temperature compensated constant current of current interrupt charger.

FIG. 11 shows the relationship between temperature and the float charging voltage in a temperature compensated charger. In a lead acid battery the voltage at which the battery relaxes to when battery current is zero or near zero is called the equilibrium voltage. For a given SoC this voltage is inversely proportional to temperature. In order to maintain a given float current, which is determined by the difference between battery equilibrium voltage and driven float voltage, it is necessary to reduce driven voltage proportionally to changes in battery equilibrium voltage. Optimally, battery float current should counteract self-discharge of the battery without significant overcharge.

Figure 12:
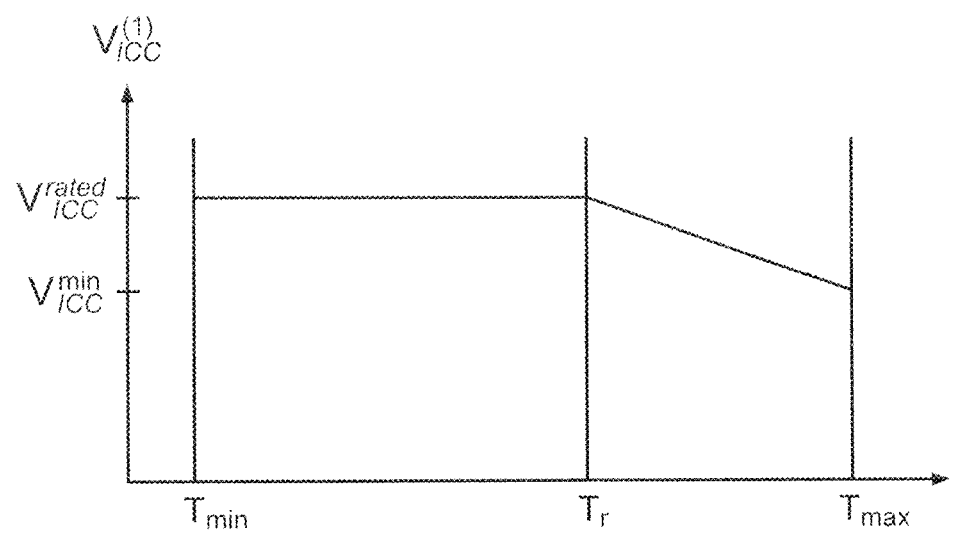
FIG. 12 is a graph detailing the change in duty cycle in a temperature compensated current interrupt charge strategy.
Figure 13:
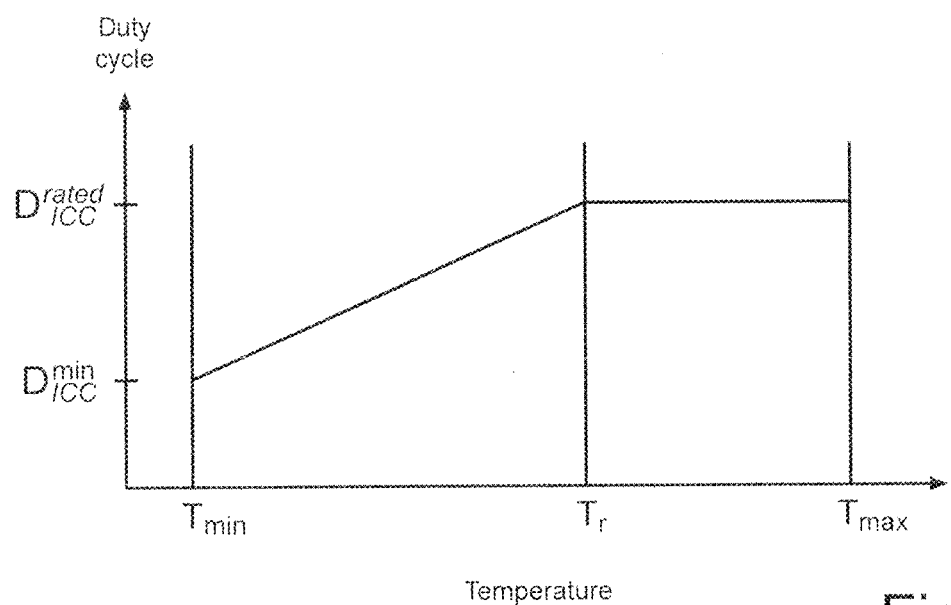
FIG. 13 is a graph detailing the relationship between charge current, battery response voltage and SoC in a constant current charge strategy.

FIG. 12 details a temperature compensation method for the current interrupt charger (ICC) in which the ceiling voltage and pulse width of the pulse charge stage is varied with changes in temperature. The ICC attempts to balance the competing need to charge at higher voltage to optimize the ratio of the primary reaction to the secondary reactions, such as the oxygen recombination cycle, with the need to avoid over potential in the cell which causes plate gassing. A primary control metric which needs to be observed is the cell equilibrium voltage. In order to accomplish this balance the ICC ends the active "On" section of the pulse in two ways. The first and most common is by controlling the pulse width as a duty cycle between on and off sections of the pulse. The second is by ending the pulse prior to reaching the nominal pulse width if the voltage of the battery exceeds that of the voltage ceiling. Both the ceiling voltage and nominal pulse width are varied with temperature to better achieve the previously mentioned balance between advantageous higher voltage charging and disadvantageous cell gassing. By tightly managing both ceiling voltage as shown in FIG. 12 and nominal pulse width as shown in FIG. 13, the temperature compensated ICC achieves higher charge voltages during the "on" portion of the pulse and avoids cell over potential and resulting gassing by allowing the cell to recover and relax over-potential during the "off" portion of the pulse.

The preferred embodiment uses two separate chargers. When combined in a sequence of four undercharging constant current charge/discharge cycles then one overcharging current interrupt charge/discharge cycle, an optimal balance between undercharging and overcharging is achieved. This charging method is optimal because when this ratio of constant current charge cycles to current interrupted charge cycles is used the average overcharge is minimal when compared to either constant voltage charging or current interrupt charging alone. The constant charge current charger and the current interrupt charger minimize overcharging while ensuring there is no long term undercharging. A constant current charger is known to have the advantage of faster charge time when compared with a constant voltage charger. The disadvantage of the constant current (CC) charger is the possibility of significant overcharge if not controlled. In the preferred embodiment the fast charge time benefit is achieved while avoiding harm of overcharge by choosing charge current values large enough to ensure the battery voltage will always reach a voltage ceiling threshold where the charge is terminated prior to reaching 100% SoC. In this way the CC charger in this embodiment has an intended undercharge target.

Figure 14:
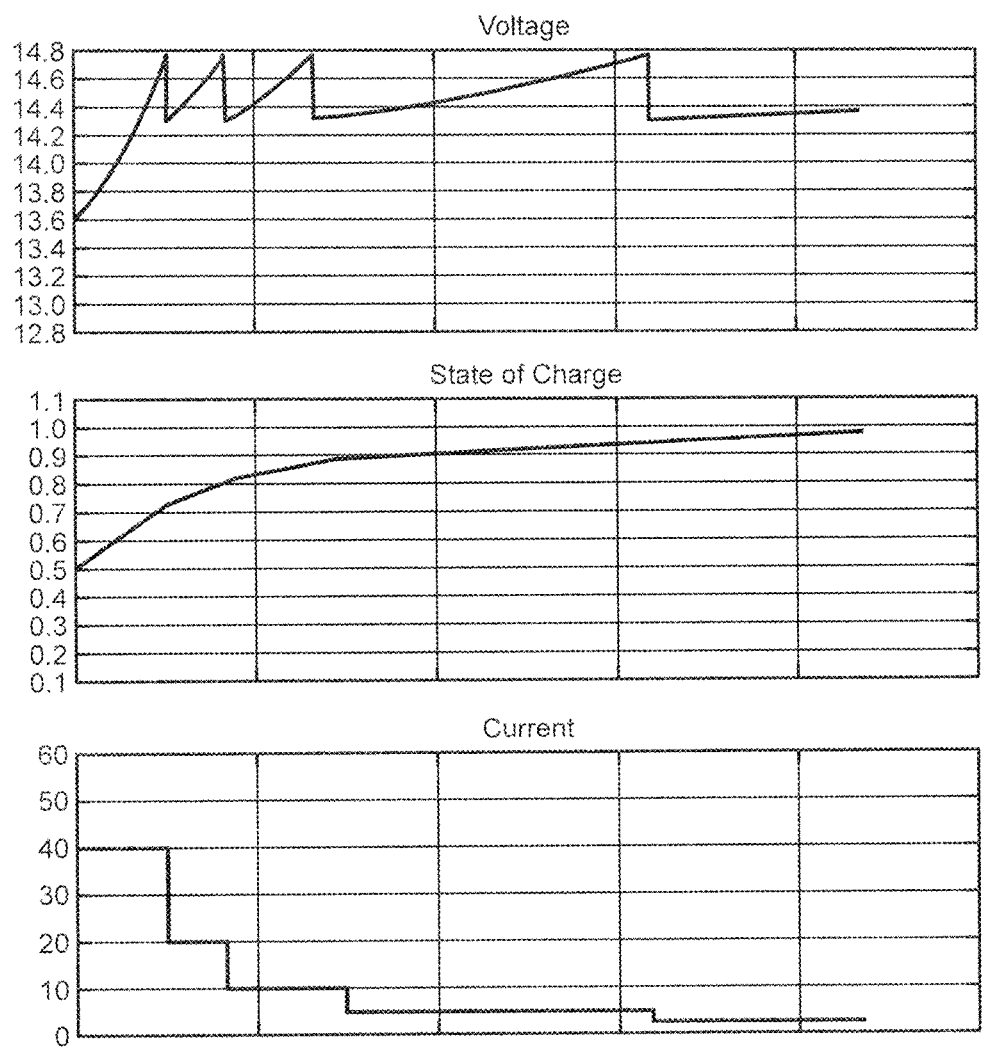
FIG. 14 is a graph detailing the relationship between charge current, battery voltage and SoC in a constant current charge strategy.

FIG. 14 shows the graphs of three separate battery parameters against time. From top to bottom they are battery voltage, SoC, and battery charge current. Together they represent the behaviour of a (CC) charger. This graph represents a charge from 50%SoC to 98% SoC, however the charger will achieve an end point of less than 100% from any SoC starting point.

Figure 15:
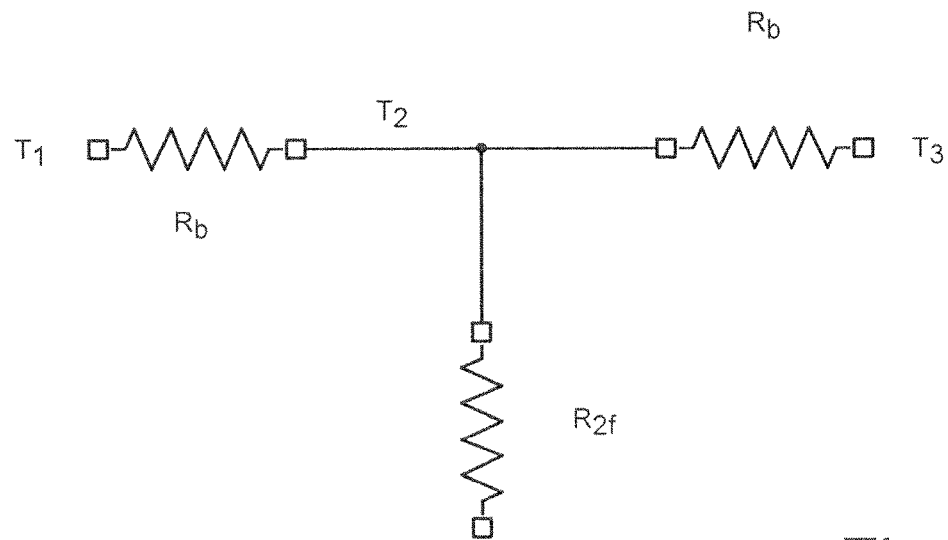
FIG. 15 is a diagram detailing the thermal resistance relationship between an inner cell, its neighbouring cells and the outside environment.

FIG. 15 details the thermal model which is used to estimate the temperature of an inner cell, i.e. cells 2-5 in a 6 cell planar battery. The temperature of each inner cell at time step t+dt is calculated from the magnitude of the two neighbouring cell temperatures and the temperature outside the battery case at time step t. The amount of influence the temperature difference between either a neighbouring cell or the battery ambient conditions has on the cell being calculated is controlled by the thermal resistance between those two elements. The relationship of the resistances to the cell temperatures is governed by the following equation:

$$C\frac{T_2^{t+dt} - T_2^d}{dt} = (T_f^t - T_2^t)R_{f2}^{-1} + (T_3^t + T_1^t - 2T_2^t)R_b^{-1},$$

Where:
$T_1^t$=Temperature of cell 1 at time (t+dt)
$T_2^t$=Temperature of cell 2 at time
$T_2^{t+dt}$=Temperature of cell 2 at time (t+dt)
$T_3^t$=Temperature of cell 3 at time t
$T_f^t$=Temperature of fluid at time t
$R_{2f}^{-1}$=Resistance to Heat transfer between fluid and cell 2
$R_b^{-1}$=Heat transfer between cells
C=Thermal capacitance of a cell.

Each of these thermal resistances has been found through previous experimentation and exist in the embedded environment within look up tables. At run time while the vehicle is in motion, the parameters used to index into this table are the vehicle velocity, the temperature of airflow over the battery and the humidity of airflow over the battery. However, If the vehicle is stopped, vehicle velocity is now zero and an additional table is now used. The parameters used to index into this "parked" table are Temperature of the air outside the battery and humidity of the air outside the battery.

Figure 16:
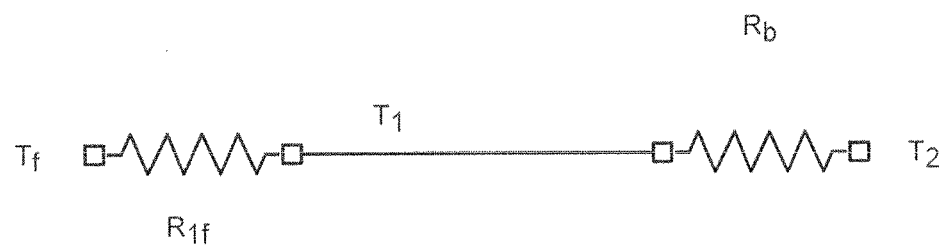
FIG. 16 is a diagram detailing the thermal resistance relationship between an end cell, its neighbouring cell and the outside environment.

FIG. 16 details the thermal model which is used to estimate the temperature of an outer cell, i.e. cells 1 or 6 in a 6 cell planar battery. The temperature of each of the two outer cells at time step t+dt is calculated from the magnitude of the one neighbouring cell temperature and the temperature outside the battery case at time step t. The amount of influence the temperature difference between either the neighbouring cell or the battery ambient conditions has on the cell being calculated is controlled by the thermal resistance between these elements and is governed by the relationship:

$$C\frac{T_1^{t+dt} - T_1^t}{dt} = (T_f^t - T_2^t)R_{f1}^{-1} + (T_2^t + T_1^t)R_b^{-1},$$

Where:
$T_1^t$=Temperature of cell 1 at time (t+dt)
$T_2^t$=Temperature of cell 2 at time t
$T_1^{t+dt}$=Temperature of cell 1 at time (t+dt)
$T_f^t$=Temperature of fluid at time t
$R_{1f}^{-1}$=Resistance to Heat transfer between fluid and cell 1
$R_b^{-1}$=Heat transfer between cells
C=Thermal capacitance of a cell.

Each of these thermal resistances has been found through previous experimentation and exist in the embedded environment within look up tables. At run time while the vehicle is in motion, the parameters used to index into this table are the vehicle velocity, the temperature of airflow over the battery and the humidity of airflow over the battery. However, If the vehicle is stopped, vehicle velocity is now zero and an additional table is now used. The parameters used to index into this "parked" table are Temperature of the air outside the battery and humidity of the air outside the battery.

Battery designs are optimized for different design goals. Some designs are tolerant of over charge while others are tolerant of deep discharge. The battery management system according to the invention minimizes float current supplied to a fully charged battery. This minimal float current will eliminate overcharging caused by battery floating. This optimal charging allows for the selection of batteries which are optimized to be tolerant of over discharge. During the discharge case the alternator is off and there are many loads which may not be shed due to safety. To address this problem it is advantageous to select a battery which is designed for deep discharge. The invention solves the overcharging issue via the use of a temperature, current and voltage regulated 4-stage charging regime or combination of constant current and current interrupt charging strategies already described. This allows for the use of a battery which is designed to be tolerant of over discharge. Generally these two battery design goals are traded off by the battery manufacturer. Minimizing overcharge of the battery while ensuring full charge allows for the use of batteries which are optimized for depth of discharge and thus do not do well with a high degree of over charge.

In order to reduce average depth of discharge, there exists a load shed regime which switches off non safety critical loads such as a radio, refrigerator, HVAC or 110V inverter. The invention bases these decision points on the SoC and or capacity of the battery thereby allowing for a much greater precision versus traditional use of battery voltage to make these control decisions. Additionally the invention tracks environmental and load conditions related to the particular vehicle and it's application. These data are related to each other to draw an optimal trade-off between extending run time for the user and guaranteeing vehicle start.

Additionally the charge and discharge scenarios or metrics of use seen by the battery pack are stored as well as broadcasted to the vehicle network. These metrics are available via the vehicle user interface as well as relayed to the backend telematics server, which in turn makes them available to fleet managers and OEM engineering. The availability of this information allows for good use scenarios to be incentivized at the fleet level and for poor use scenarios to be identified on the individual vehicle level thus allowing for an enforcement regime with the goal of reducing overall cost of ownership for the operation of the vehicle.

LIST OF REFERENCE SIGNS

BMS battery management system
14 battery
16 sensing means
18 current sensor
20 voltage sensor
22 temperature sensor
24 automotive alternator
26 automotive electronic control unit
28 line
30 graph
32 abscissa
34 left-hand ordinate
36 right-hand ordinate
38 equivalent circuit model
$V_{Cb}$, $V_{Cs}$, $V_O$ voltages
$I_b$, $I_s$ currents
(a), (b), (c), (d) stages
$C_b$ bulk capacitance
$C_s$ surface capacitance
$R_b$ bulk resistance
$R_S$ surface resistance
$R_t$ terminal resistance The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for charging a battery having a plurality of battery cells, comprising the steps of:
    forcing the battery through a charging regime including two or more constant current charge stages in which the battery is charged in an initial stage with a constant charge current with an initial amperage to an initial temperature compensated battery voltage at which point a successive stage begins with a lower charge current than the initial stage,
    wherein the successive stage lasts until a subsequent temperature compensated battery voltage has been reached and
    the initial and subsequent temperature compensated battery voltages are determined based on an ambient temperature and a state of charge of the battery.

2. The method according to claim 1, wherein the constant current charge stages are alternated with current interrupt charge stages.

3. The method according to claim 2, further comprising the step of:
    fixing a schedule for alternation of the constant current charge stages and the current interrupt charge stages.

4. The method according to claim 2, further comprising the step of:
    varying a schedule for alternation of the constant current charge stages and the current interrupt charge stages based on a battery internal state estimation.

5. The method according to claim 1, wherein as the ambient temperature increases, the initial or subsequent temperature compensated battery voltage decreases.

6. The method according to claim 1, wherein the charging regime includes four or more constant current charge stages.

7. The method according to claim 6, wherein the charging regime includes a total of four constant current charge stages.

8. The method according to claim 7, wherein a first stage among the total of four constant current charge stages spans approximately 0% to 80% of the state of charge of the battery.

9. The method according to claim 6, wherein the constant charge current in an immediately preceding stage is higher than the constant charge current in an immediately subsequent stage.

* * * * *